United States Patent [19]

Nishikawa et al.

[11] 4,039,344

[45] Aug. 2, 1977

[54] ALUMINA-CHROME REFRACTORY COMPOSITION

[75] Inventors: Yasuo Nishikawa, Okayama; Takeo Okamura; Katsuhei Minami, both of Bizen, all of Japan

[73] Assignee: Kyushu Refractories Co., Ltd., Japan

[21] Appl. No.: 660,407

[22] Filed: Feb. 23, 1976

[30] Foreign Application Priority Data

Mar. 6, 1975 Japan .................................. 50-27806

[51] Int. Cl.$^2$ .................... C04B 35/42; C04B 35/44
[52] U.S. Cl. ........................................ 106/66; 106/65; 106/67; 106/59; 106/57; 106/69
[58] Field of Search ............................. 106/66, 65, 59

[56] References Cited

U.S. PATENT DOCUMENTS

| | | | |
|---|---|---|---|
| 3,365,318 | 1/1968 | Nameishi | 106/65 |
| 3,505,101 | 4/1970 | Koffskey et al. | 106/66 |
| 3,773,532 | 11/1973 | Manigault | 106/66 |

Primary Examiner—Winston A. Douglas
Assistant Examiner—J. V. Howard
Attorney, Agent, or Firm—Wenderoth, Lind & Ponack

[57] ABSTRACT

An alumina-chrome refractory composition comprises 30-60% by weight of alumina-silica type material containing 50-95% by weight of alumina with the major part in coarse particle size, and 70-40% by weight of chrome type material with the major part in fine particle size. In a modification, the alumina-chrome refractory composition comprises 70-99% by weight of a mix consisting of the alumina-silica type material and chrome type material in the above percentages, and 1-30% by weight of at least one of the materials selected from the group consisting of alumina, zircon, zirconia, magnesia, spinel, clay, silicon carbide and titanium oxide in fine particle size ranges.

2 Claims, No Drawings

ALUMINA-CHROME REFRACTORY COMPOSITION

The present invention relates to an alumina-chrome refractory composition consisting of alumina-silica type material and chrome type material.

More particularly, the invention relates to an alumina-chrome refractory composition comprising 30-80% by weight of alumina-silica type material containing 50-95% by weight of alumina with the major part in coarse particle size, and 70-20% by weight of chrome type material with the major part in fine particle size. In a modification, in 70-99% by weight of said refractory composition can be contained 1-30% by weight of at least one of the materials selected from the group consisting of alumina, zircon, zirconia, magnesia, spinel, clay, silicon carbide and titanium oxide in fine particle size ranges.

The present invention is to provide an alumina-chrome refractory composition having excellent properties for use as a lining of a steel working ladle of a convertor or electric furnace, other ladles, tundish, torpedo ladle and the like, or as a convertor mouth, in the form of fired or unfired refractory brick, or in the form of monolithic refractory such as gunning material, stamping material, slinger material and castable material.

Conventionally, the refractories such as high purity silicate type or zircon type materials are employed for a refractory lining of steel working ladle of a convertor or electric furnace, tundish and the like. However because of the requirement for high quality steel as well as rationalization of production, the ladle or the like is necessarily used at higher temperature, the steel is held for a longer period of time in the ladle, and the degassing or other treatments is conducted within the ladle, thus putting the ladle under the more and more severe using conditions. As a result, durability of the refractory for the ladle and the like is lowered.

Regarding the properties required for a refractory as a lining of the ladle or the like, there are high load softeningness, lower porosity, abrasion resistance, spalling resistance, slag resistance and non-adhesiveness against metal, slag or the like.

Though the conventional high purity silicate type refractory mentioned before is inexpensive, it has a defect of poor slag resistance. On the other hand, the zircon type refractory has a higher slag resistance, but the raw materials thereof are maldistributed on the earth, resulting in a higher price.

Further, the basic refractory has an excellent slag resistance, but has fatal defects in its slag absorption, exfoliation and adherence of metal during using. On the other hand, the refractory consisting of alumina mineral and chromium oxide has various superior characteristics, but has disadvantages in its difficulties of sintering and of obtaining high density one.

The refractory consisting of high purity alumina material and a small amount of chrome type material has a defect of poor slag resistance, particularly of its noticeable deterioration of slag resistance against a highly basic slag.

A monolithic refractory is recently of wide use as repairs for damages of a refractory brick lining in the ladle of steel furnace and other ladles, and as a stamping material or slinger material in place of a fired refractory brick. Especially, since the gunning material is suitable for repairs at damaged portions of the ladle which is exposed to the severe partial damages, and since the material enables lowering a consumption unit of a refractory for the ladle, reduction of repairing time and ready operation, it has a great economical merit. Therefore its quality improvement is expected.

Naturally, this gunning material is also required to have durability similar to the shaped refractory for furnace lining, and other particular properties of its own as well, i.e., required to securely adhere to the furnace wall upon spraying thereagainst without the loss due to scattering or flowing-down, and also to rapidly solidify after spraying so as to maintain its shape. However since it is inevitable that the gunning material has a lower quality in its composition after spraying, as compared to the shaped refractory, and further since the corrosion is larger, particularly at the matrix portion rather than the course particle portion, it is necessary to reinforce the matrix portion.

An acidic gunning material consisting mainly of agalmatolite and silica, known as a prior art gunning material, is lower in its slag resistance since the glass phase is easily produced at the matrix portion. Further its slurry has a disadvantage in the high viscosity causing the nozzle of a spraying gun to be blocked.

In order to provide an excellent refractory composition solving the above-mentioned various defects in the prior art refractories, the present inventors have made researches to obtain with success a superior alumina-chrome refractory composition having required properties suitable for a lining of the ladle or the like as well as high slag resistance against any kind of slag and comprising an alumina-silica type material containing 50-95% by weight of alumina, a chrome type material, and preferably as a third component, at least one of the materials selected from the group consisting of alumina, zircon, zirconia, spinel, clay, silicon carbide, titanium oxide and the like. That is to say, the inventors have studied the components of the alumina-silica type material which would contain the least possible amount of silicate and which would prevent the structural spalling due to the adhesion and penetration of the slag which are caused by the alumina component. As a result it has been found that both the component ratio of the chrome type material with respect to the alumina-silica type material and the particle size distribution of these materials are the most important factors for preventing said structural spalling caused by the adhesion and penetration of the slag, and that the secondary sintering can be avoided and the high temperature suitability as of non-penetration of the slag and volume stability can be improved by mixing, as a third component, at least one of the above-mentioned materials.

The alumina-silica type refractory material employed in the present invention contains 50-95% by weight of alumina as a main component. For such refractory material, synthetic mullite, sillimanite, cyanite, andalusite, diaspore, bauxite and other alumina shales are preferable.

Except that the alumina-silica type material originally contains mullite, the latter is generated by the heat during firing or using a brick, to be contained in the coarse particle size range, thereby making it possible to prevent removal of brick, corrosion of the joint portion and cracking.

According to the present invention, the alumina contents in the alumina-silica type material are limited to 50-95% by weight. The reason is that in the case of less than 50% by weight the silicate contents will naturally increase to lower the slag resistance, and in the case of more than 95% by weight, less mullite will be produced to lower the volume stability and the resistability against corrosion at the joint portion as well as cracking.

It is preferable that said alumina-silica type refractory material mainly includes coarse particles in a size range more than 1mm. When less amount of chrome type material is used with respect to the alumina-silica type material, said size range may be less than 1mm but is preferably more than 0.1mm, because when included the alumina-silica type material in the particle size range less than 0.1mm, it remarkably spoils the slag resistance of the obtained refractory composition. However, when the amount of the material in the particle size range less than 0.1mm is minimized by the use of relatively large amount of the alumina-silica material, or when the negligible amount is inevitably mixed during the production process, it is allowable since it has the least influence on the properties of the composition of the invention.

As to the chrome type material, there are the materials containing 15-65% by weight of $Cr_2O_3$ such as chrome ore, chrome-magnesia clinker and chrome-magnesia brick scrap, among which the chrome ore is the most preferable, the particle size thereof, with its major part, being in a fine size range less than 1mm. However the particles more than 1mm is size can be mixed according as the mixing amount of the chrome type material increases.

Regarding the mixing ratio of these alumina-silica material and chrome material, the former is 30-80% by weight, preferably 30-60% by weight, while the latter is 70-20% by weight, preferably 70-40% by weight. If contained less than 20% by weight of the chrome material, i.e., more than 80% by weight of the alumina-silica material, the refractory composition lacks in slag resistance against highly basic slag, and the silicate amount inevitably increases at the matrix portion to generate the glass phase. On the contrary, when contained more than 70% by weight of the chrome material, the metal or slag adheres to the bricks of the furnace wall, and the corrosion unbalance is caused between the coarse particle and matrix portion to lower the durability of the furnace. Therefore the mixing ratio out of said range is unpreferable.

When the chrome material is properly mixed in the refractory composition, $Cr_2O_3$ contents therein exhibit an excellent resistability against the slag. Especially the component $Cr_2O_3$ will be little affected by the basicity variation of slag, showing excellent slag resistance against any kind of any basicity. Further $SiO_2$ and $Fe_2O_3$ contents in the chrome material have an effect to promote the firing whereby the brick heated during firing or using becomes dense to improve its toughness at high temperature and to be prevented from slag penetration.

According to the present invention, another refractory material may be added, as a third component, to 70-99% by weight of a mix consisting of 30-80% by weight of the alumina-silica material together with 70-20% by weight of the chrome material, for the purpose of improving the high temperature suitability such as anti-secondary-sintering, non-penetration of slag and volume stability at high temperatures. Such refractory material is at least one of the materials selected from the group consisting of alumina, zircon, zirconia, magnesia, spinel, clay, silicon carbide, titanium oxide and the like, among which the most effective is alumina.

The suitable amount of the refractory material as the third component is 1-30% by weight, preferably 5-30% by weight, in a fine particle size range less than 1mm, with respect to 70-99% by weight of the mix consisting of said alumina-silica refractory material and chrome material. When contained less than 1% by weight, the third component has no effect on the obtained refractory composition. When contained more than 30% by weight, the amount of the chrome material in the fine particle size range should be decreased to cause the component unbalance and to have bad influence to the slag resistance of the obtained refractory composition.

Concrete examples of the materials used as the third component are as follows: alumina such as electrically molten alumina, sintered alumina and Bayer alumina; zircon; zirconia; magnesia such as sea magnesia clinker, sintered magnesia; spinel such as aluminate magnesium spinel; clay containing 25-50% by weight of alumina such as kaolinic clay, gallic clay, frogeye clay and their water sieved ones.

Within the range not affecting the properties of the refractory composition of the invention, there can be added inorganic or organic binder, and if required, a plasticizer, for the purpose of improving the adhesiveness, in order to use the composition especially as a gunning material and the like of monolithic form, thereby making it possible to promote the immediate solidification after spraying and to avoid the dropping or flowing-down after its adhesion.

Suitable inorganic binder is borate, phosphate, and silicate of either akali metals or alkalic earth metals, or calcium compound, the concrete compounds of which are sodium borate with the ten crystal waters, hexasodium methaphosphate, calcium dihydrogen phosphate, sodium methasilicate, calcium hydroxide, aluminium phosphate and the like.

As the organic binder is used sodium lignin sulphonate, dextrin or the like.

The amount of the inorganic or organic binder added to the refractory composition is not strictly defined, but preferably is in the effective range from 0.2% to 7.0% by weight.

As mentioned before, there can also be added a plasticizer such as carboxymethylcellulose, polyvinylalcohol, sodium alginate, bonding clay, bentnite or others.

Now, the particle size distribution in the refractory composition of the invention varies in accordance with its using forms such as refractory brick or gunning material. Generally speaking it is preferable that the composition consists of about 50% by weight of fine particles less than about 1mm in size, and about 50% by weight of coarse particles ranging from about 1mm to about 10mm in size. However, if required, the ratio may be changed. Especially for a gunning material the smaller particles may be suitable, but for a stamping or castable refractory the larger particles will meet.

The alumina-silica material used in a coarse particle size range mainly reacts on CaO, $Fe_2O_3$ and the like in the basic slag to produce glass phase, which dissolves into the slag without forming a thick reaction layer. On the other hand, the chrome material used in a fine particle size range also reacts on the basic slag to produce glass phase. However, chrome oxide, which is the main component of the chrome material, gives the slag a higher viscosity, thereby effectively preventing the slag penetration into the refractory composition.

As to the reactiveness to the basic slag of the alumina-silica material and the chrome material, the former has a smaller resistency, as is well known. However, according to the present invention, it is so adapted that the difference of slag resistance between the former and latter is balanced by the difference of particle sizes therebetween, by using them in suitable particle size ranges the uniform corrosion is attained at both the coarse particle portion and matrix portion.

Generally, the penetration of the slag into the refractory composition causes the corrosion of the matrix portion rather than the coarse particle portion, which the latter dissolves in the slag in a state with little reaction therewith.

In the present invention, however, by mixing, in a fine particle size range, mainly the chrome material, and by mixing, in a coarse particle size range, mainly the alumina-silica material, their reaction velocities to the basic slag are adapted to be almost equal, thereby enabling remarkable improvement of the slag resistance as a whole of the obtained refractory composition. Moreover, the use of the alumina-silica material in the coarse particle size range makes it possible to maintain the volume stability and to prevent the falling-off of the brick and corrosion of the joint portion.

Furthermore, the high temperature suitability such as anti-secondary-sintering, non-penetration of slag, volume stability can be improved by adding at least one of the materials as the third component selected from the group consisting of alumina, zircon, zirconia, magnesia, spinel, clay, silicon carbide, titanium oxide and the like, to the refractory composition consisting of said alumina-silica material and chrome material.

As described above, the refractory composition of the instant invention exhibits an excellent durability by the cooperation of two or three components employed.

The refractory composition of the invention is thus superior in slag resistance, and has various usages in various fields such as: a lining for the ladle of steel work furnace or other ladles, tundish, torpedo ladle, electric furnace hearth, desulphurizing tank, runner for molten pig iron or steel, metal refining apparatus, or the like; or convertor mouth; in the forms of fired or unfired brick, or monolithic refractories as of stamping material, slinger material, vibration shaping material, castable material, plastic material and the like.

In order to more clearly illustrate the instant invention, references are now to be made to the following Examples showing the components as well as properties of the alumina-chrome refractory composition. However it is to be understood that the Examples are only for description rather than limitation to the invention.

EXAMPLES 1-6 Fired Brick

Table I shows the chemical compositions of the alumina-silica material, chrome material and the materials used as the third component, in the above Examples.

TABLE I

| Chemical Composition (%) Material | $SiO_2$ | $Al_2O_3$ | $Fe_2O_3$ | CaO | MgO | $Cr_2O_3$ | SiC |
|---|---|---|---|---|---|---|---|
| Sillimanite | 20.2 | 78.8 | 0.5 | 0.2 | 0.3 | | |
| Burnt Bauxite | 4.9 | 90.6 | 0.9 | 0.2 | 0.4 | | |
| Synthetic Mullite | 26.1 | 71.1 | 0.7 | 0.3 | 0.1 | | |
| Cyanite | 32.5 | 62.6 | 4.0 | 0.1 | 0.5 | | |
| South African Clay | 46.4 | 51.7 | 0.5 | 0.2 | 0.2 | | |
| Philippine Chrome Ore | 3.7 | 24.9 | 21.1 | 0.5 | 14.3 | 35.6 | |
| Chrome-magnesia Clinker | 2.0 | 12.5 | 10.6 | 0.8 | 56.2 | 17.9 | |
| Chrome-magnesia Brick Scrap | 4.6 | 17.3 | 9.4 | 1.0 | 48.9 | 18.8 | |
| Electrically Molten Alumina | 0.1 | 99.2 | 0.1 | | | | |
| Zircon Flour | 33.0 | 0.4 | 0.1 | 0.1 | 0.1 | ($ZrO_2$) 66.2 | |
| Water Sieved Clay | 58.2 | 27.8 | 0.6 | 0.1 | 0.2 | | |
| Magnesia Clinker | 0.3 | 0.1 | 0.1 | 1.1 | 98.2 | 0.2 | |
| Spinel Clinker | 0.5 | 70.7 | 0.3 | 0.7 | 27.8 | | |
| Silicon Carbide | 1.0 | 0.5 | 0.5 | 0.1 | 0.1 | | 97.0 |

The materials having the chemical composition listed in Table I were blended at the percentages shown in Table II, to which was added 3.5% of pulp drainage. The mix was kneaded by a wet-pan kneader. The batch was pressure-moulded by a friction press machine and fired at 1,300° C to obtain fired bricks.

TABLE II

| Example No. | 1 | 2 | 3 | *4 4 | *5 5 | *6 6 |
|---|---|---|---|---|---|---|
| Material (%) | | | | | | |
| Sillimanite (3-1mm)*1 | | | | 40 | | |
| Burnt Bauxite (5-1mm) | | 50 | | | | |
| Synthetic Mullite (3-1mm) | 50 | | | | | |
| " (less 1mm) | 20 | | | | | |
| Cyanite (3-1mm) | | | | | 35 | 50 |
| " (less 1mm) | | | | | | 15 |
| South African Clay (3-1mm) | | | 33 | | | |
| Phil. Chrome Ore A*2 (3-1mm) | | | 17 | 10 | 15 | |
| " (1-0.125mm) | | | 20 | 20 | 20 | 5 |
| " (less 0.125mm) | 30 | | 30 | 25 | 15 | 20 |
| Phil. Chrome Ore B*3 (1-0.125mm) | | 20 | | | | |
| " (less 0.125mm) | | 30 | | | | |
| Electrically Molten Alumina (less 0.125mm) | | | | | | 5 |
| Zircon Flour (less 0.125mm) | | | | | 5 | |
| Water Sieved Clay (less 0.125mm) | | | | | | 5 |
| Magnesia Clinker (less 0.125mm) | | | | | | 5 |
| Silicon Carbide | | | | | | |

TABLE II-continued

| Example No. | 1 | 2 | 3 | *4 4 | *5 5 | *6 6 |
|---|---|---|---|---|---|---|
| (less 0.125mm) | | | | | | 10 |

N.B.
*1 What is indicated in the parentheses shows the particle size of each material.
*2 Philippine chrome ore A denotes raw chrome ore.
*3 Philippine chrome ore B denotes fired chrome ore.
*4, *5, *6 In these Examples the third component is used.

Table III shows the chemical composition as well as the physical properties of each fired brick as composed according to the above Table II. The slag test was conducted under the following conditions:
1 Test Temperature; 1,650° C
2 Revolution of Test Piece; 5 r.p.m.
3 Slag; Convertor Slag:Metal Iron = 1:1
4 Test Period; for one hour

TABLE III

| Example No. | 1 | 2 | 3 | 4 | 5 | 6 | Control* |
|---|---|---|---|---|---|---|---|
| Chemical Composition (%) | | | | | | | |
| $SiO_2$ | 19.4 | 3.4 | 17.8 | 11.8 | 16.3 | 22.1 | 27.1 |
| $Al_2O_3$ | 57.3 | 57.8 | 33.8 | 45.2 | 35.9 | 52.1 | 19.7 |
| $Fe_2O_3$ | 6.8 | 11.1 | 14.4 | 11.8 | 12.1 | 7.9 | |
| CaO | 0.4 | 0.4 | 0.4 | 0.3 | 0.3 | 0.2 | |
| MgO | 4.4 | 7.4 | 9.7 | 8.0 | 7.4 | 8.8 | |
| $Cr_2O_3$ | 10.7 | 17.8 | 23.9 | 19.6 | 17.8 | 8.9 | |
| $ZrO_2$ | | | | 3.0 | | | 49.4 |
| SiC | | | | | | 9.7 | |
| Physical Property | | | | | | | |
| Apparent Porosity (%) | 16.5 | 18.0 | 15.0 | 14.2 | 14.0 | 13.6 | 18.3 |
| Water Absorption (%) | 6.2 | 5.8 | 5.0 | 4.7 | 4.4 | 4.3 | 5.2 |
| Apparent Specific Gravity | 3.18 | 3.75 | 3.50 | 3.56 | 3.67 | 3.65 | 4.30 |
| Bulk Density | 2.66 | 3.08 | 2.97 | 3.05 | 3.15 | 3.15 | 3.51 |
| Compressive Strength ($Kg/cm^2$) | 550 | 570 | 600 | 580 | 650 | 640 | 550 |
| Slag Test Reaction Layer Thickness (mm) | 2.0 | 2.0 | 1.5 | 2.0 | 1.5 | 1.5 | 2.5 |
| Corrosion Amount (mm) | 16.6 | 11.4 | 10.7 | 10.2 | 12.8 | 15.5 | 35.0 |

N.B.
*In the Control Example, zircon-alumina type fired brick was used.

EXAMPLES 7-10 Unfired Brick

The materials shown in Table I were mixed in accordance with the percentage shown in the following Table IV, to which was added primary aluminum phosphate as a binder. The mix was kneaded by a wet-pan kneader. The obtained batch was pressure-moulded by a friction press machine and dried at 250° C for 48 hours to obtain unfired bricks. The physical properties thereof are shown in Table V.

TABLE IV

| Example No. | 7 | 8 | 9 | 10 |
|---|---|---|---|---|
| Material (%) | | | | |
| Sillimanite (3-1mm) | | 30 | 50 | |
| " (less 1mm) | | | 20 | |
| Synthetic Mullite (3-1mm) | 50 | | | 50 |
| Phil. Chrome Ore A (3-1mm) | | | 20 | |
| " (1-0.125mm) | 20 | 20 | | 20 |
| " (less 0.125mm) | 30 | 30 | 22 | 25 |
| Magnesia Clinker (less 0.125mm) | | | 8 | |
| Silicon Carbide (less 0.125mm) | | | | 5 |
| Binder | 2 | 2 | 2 | 2 |

TABLE V

| Example No. | 7 | 8 | 9 | 10 | Control |
|---|---|---|---|---|---|
| Chemical Composition (%) | | | | | |
| $SiO_2$ | 14.6 | 8.5 | 15.0 | 14.8 | 56.3 |
| $Al_2O_3$ | 48.1 | 40.3 | 60.7 | 46.8 | 8.1 |
| $Fe_2O_3$ | 10.7 | 14.6 | 5.0 | 9.8 | |
| CaO | 0.4 | 0.5 | 0.3 | 0.4 | |
| MgO | 7.1 | 9.8 | 11.2 | 6.5 | |
| $Cr_2O_3$ | 17.5 | 24.3 | 7.8 | 16.0 | ($ZrO_2$) 32.1 |
| SiC | | | | 4.9 | |
| Physical Property | | | | | |
| Apparent Porosity(%) | 13.0 | 12.5 | 12.1 | 12.3 | 11.9 |
| Water Absorption (%) | 4.7 | 3.7 | 4.0 | 4.3 | 4.1 |
| Apparent Specific Gravity | 3.20 | 3.80 | 3.47 | 3.23 | 3.32 |
| Bulk Density | 2.78 | 3.33 | 3.02 | 2.84 | 2.86 |
| Compressive Strength ($Kg/cm^2$) | 400 | 450 | 500 | 520 | 170 |
| Slag Test Reaction Layer Thickness (mm) | 2.0 | 2.0 | 1.5 | 1.0 | 2.0 |
| Corrosion Amount (mm) | 18.7 | 14.9 | 22.4 | 16.5 | 43.0 |

EXAMPLES 11-15 Monolithic Refractory

The materials were blended in accordance with the percentage shown in the following Table VI, to which was added sodium hexamethaphosphate as a binder. The batch kneaded by a wet-pan kneader was formed into monolithic refractory.

The physical property in Table V was measured after pressure-moulding the batch under the pressure of 500 $Kg/cm^2$ and drying it for 24 hours at 250° C. The slag test was conducted under the same conditions as the fired bricks of Examples 1 to 6.

TABLE VI

| Example No. | 11 | 12 | 13 | 14 | 15 |
|---|---|---|---|---|---|
| Material (%) | | | | | |
| Burnt Bauxite (5-1mm) | | 50 | | | 30 |
| " (less 1mm) | 20 | | | | |
| Synthetic Mullite (3-1mm) | | | | 50 | |
| Cyanite (5-1mm) | | | 50 | | |
| South African Clay (3-1mm) | | | | 30 | |
| Phil. Chrome Ore A (3-1mm) | | | | 20 | 20 |
| " (1-0.125mm) | | 20 | 20 | 20 | 20 |
| " (less 0.125mm) | 30 | 30 | 25 | 15 | 10 |
| Chrome-magnesia Clinker(less 0.125mm) | | | | | 10 |
| Chrome-magnesia Brick Scrap(less 0.125mm) | | | | | 10 |
| Water Sieved Clay (less 0.125mm) | | | 5 | | |
| Spinel Clinker (less 0.125mm) | | | | 15 | |
| Binder | 3 | 3 | 3 | 3 | 3 |

TABLE VII

| Example No. | 11 | 12 | 13 | 14 | 15 | Control |
|---|---|---|---|---|---|---|
| Chemical Composition (%) | | | | | | |
| $SiO_2$ | 4.5 | 17.7 | 18.3 | 15.6 | 4.0 | 27.1 |
| $Al_2O_3$ | 71.2 | 43.0 | 48.9 | 39.1 | 42.1 | 19.7 |
| $Fe_2O_3$ | 6.9 | 12.3 | 9.9 | 11.6 | 12.6 | |
| CaO | 0.3 | 0.4 | 0.4 | 0.6 | 0.6 | |
| MgO | 4.6 | 7.3 | 6.5 | 11.9 | 17.4 | |
| $Cr_2O_3$ | 10.7 | 17.4 | 16.0 | 19.1 | 21.1 | ($ZrO_2$) 49.4 |
| Physical Property | | | | | | |
| Apparent Porosity (%) | 20.2 | 18.1 | 17.6 | 17.5 | 18.7 | 23.0 |
| Water Absorption (%) | 6.9 | 5.8 | 6.4 | 6.1 | 6.1 | 6.5 |
| Apparent Specific Gravity | 3.67 | 3.78 | 3.33 | 3.48 | 3.77 | 4.55 |
| Bulk Density | 2.93 | 3.09 | 2.74 | 2.87 | 3.06 | 3.50 |
| Compressive Strength ($Kg/cm^2$) | 350 | 410 | 400 | 370 | 350 | 200 |
| Slag Test Reaction Layer Thickness (mm) | 2.0 | 2.0 | 2.5 | 1.5 | 2.0 | 3.0 |
| Corrosion Amount (mm) | 24.3 | 23.2 | 21.0 | 19.6 | 18.3 | 50.0 |

As will be understood from the above Examples, any of them exhibits great differences in the corrosion as compared to the Control Examples using the zircon type refractories. Especially as apparent from Examples 4 to 6, 9, 10 and 13 to 15, the noticeable differences were observed and the slag resistance was remarkably improved in the refractories mixed with the third components such as alumina.

What we claim is:

1. An alumina-chrome refractory composition consisting essentially of:
   30–60 weight % of an alumina-silica material containing 50–95 weight % of alumina and consisting of particles in which the major portion is coarser than 0.1 mm in size, said alumina-silica material being at least one of the materials selected from the group consisting of synthetic mullite, sillimanite, cyanite, andalusite, diaspore, bauxite and other alumina shales
   70–40 weight % of a chrome material containing 15–65 weight % of chromium oxide and wherein the major portion consists of particles finer than 1 mm in size, said chrome material being at least one member selected from the group consisting of chrome ore, chrome-magnesia clinker and chrome-magnesia brick scrap.

2. An alumina-chrome refractory composition as claimed in claim 1, wherein 70–99 weight % of a mix consisting of said alumina-silica material and chrome material in said ratio and particle size is added with 1–30 weight % of at least one member selected from the group consisting of alumina, zircon, zirconia, magnesia, spinel, clay, silicon carbide and titanium oxide in a particle size finer than 1 mm.

* * * * *